July 12, 1938.  A. H. NEILSON  2,123,791
FISHING TOOL
Original Filed March 9, 1936
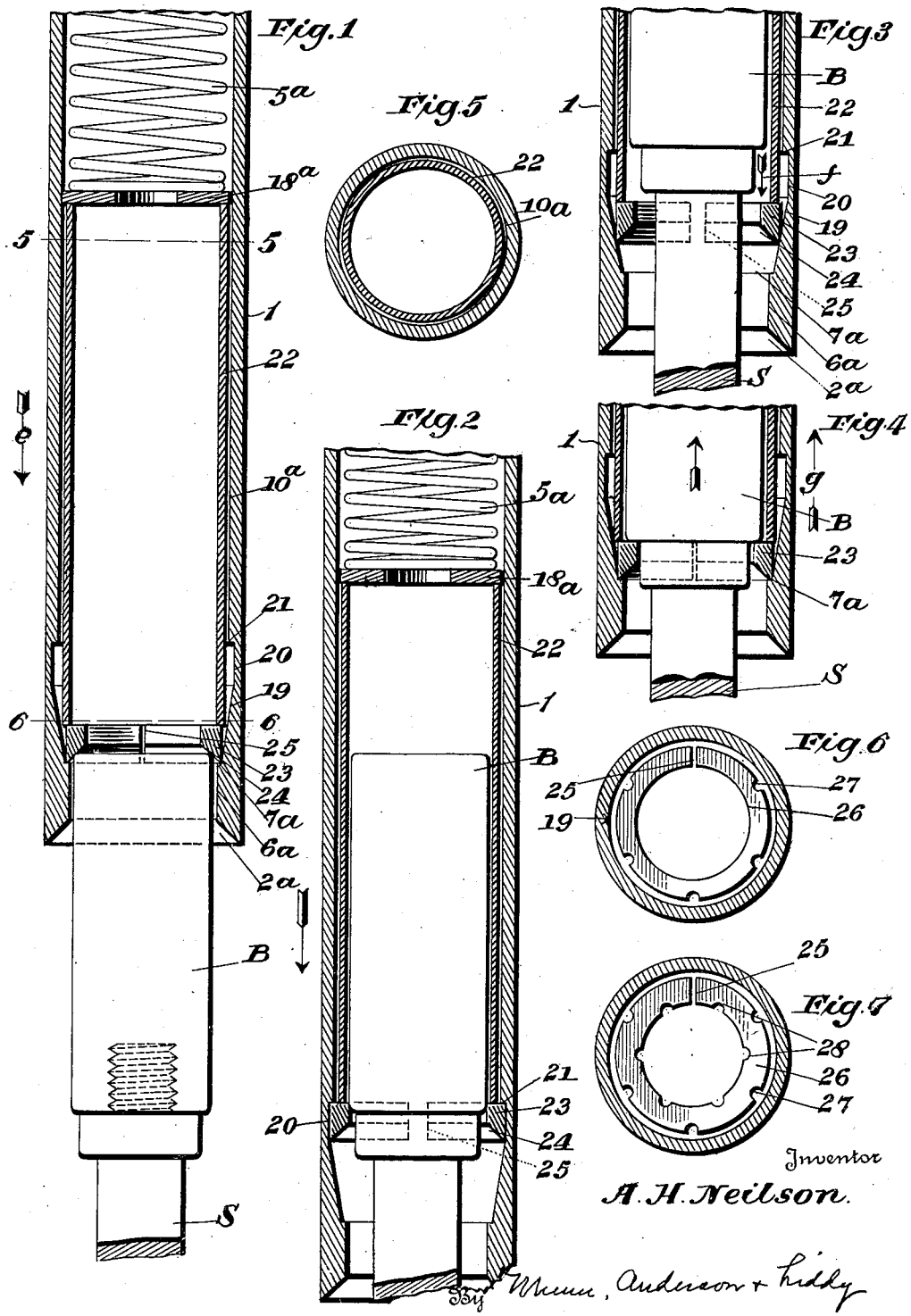
Inventor
A. H. Neilson.

Patented July 12, 1938

2,123,791

UNITED STATES PATENT OFFICE 2,123,791

FISHING TOOL

Albert H. Neilson, Tulsa, Okla.

Original application March 9, 1936, Serial No. 67,983. Divided and this application September 23, 1936, Serial No. 102,229

3 Claims. (Cl. 294—99)

This invention relates to improvements in fishing tools such as are commonly used in catching lost sucker rods and the like from deep wells, and its object is as follows:

To provide a fishing tool having a split ring which is so expansible and contractible within a suitably provided recess in the barrel as to catch a pin or box, said ring, although non-reversible, actually reducing the cost of purchase and maintainance of the socket because its utmost simplicity enables providing a relatively large number of sizes (internal diameter sizes) to suit as many sizes of pins and boxes.

In the drawing:—

Figure 1 is a longitudinal section of the split ring type of fishing tool illustrating the approach of the tool toward the box of a lost sucker rod.

Figures 2, 3 and 4 are detail sectional views illustrating successive acts during the catching and gripping of the box.

Figure 5 is a cross section taken on the line 5—5 of Figure 1.

Figure 6 is a cross section taken on the line 6—6 of Figure 1.

Figure 7 is a section similar to Figure 6, but illustrating the use of a slip ring with a smaller internal diameter.

This application is a division of an application for patent for fishing tool filed by Albert H. Neilson March 9, 1936, Serial No. 67,983, now Patent No. 2,096,525. Further, it is a direct improvement on the fishing tools or rod suckers of A. H. Neilson disclosed in Patents 1,382,602 of June 21, 1921 and 1,433,146 of Oct. 24, 1922. Each of these patents is largely concerned with a slip of that design which will enable the catching of more than one size of pin, box or pipe.

Modern oil well engineering has developed much harder pins and boxes for sucker rod couplings, so that slips of the types in the patents with multiple wickers for catching various sizes of pins and boxes, are no longer as efficient as desired. In other words, the metal of the modern pins and boxes is made so hard that it is difficult to make multiple wickers bite deeply enough to obtain an effective hold.

The foregoing circumstance has brought with it the virtual necessity of requiring a slip for every size of pin and box to be fished, but this necessity is relieved by the provisions described below which make it possible to catch a multitude of sizes of fittings. This statement should be qualified by the explanation that it is not the one size of ring shown that enables catching the multitude of sizes of fittings, but rather that the ring is so simple and cheap that a large stock of sizes can be kept on hand and so equip the tool here shown for the multiple fishing mentioned.

Attention is directed to the drawing. The entrance bore $6^a$ adjacent to the bevelled entrance $2^a$ of the barrel 1, terminates in an annular shoulder $7^a$ providing an internal support, but this shoulder is formed by the smallest diameter of an upward flare 19, which merges into an expansion and working recess 20. The bore which forms the recess 20 is reduced at the top to form a shoulder 21 after which the normal bore $10^a$ of the barrel continues on up as shown. The spring $5^a$ and a washer $18^a$ serve a purpose presently explained.

The pressure imposed by the spring $5^a$ upon the washer $18^a$ is directed to a plain sleeve 22. This sleeve supports the washer $18^a$ and it rests upon a ring 23. Said ring has a bevelled entrance 24, and it is split at 25. The purpose of the split is to enable expansion in the space 20 and contraction in the flare 19.

The internal diameter 26 of this ring is subject to variation. In other words, it is intended to furnish numbers of the rings each with a different internal diameter, but with the same external diameter. Every change in internal diameter will suit a different size of sucker rod fitting. The particular ring in Figs. 1, and 6, is notched at 27 on its outer periphery to give it a degree of flexibility. When the internal diameter 26 is made smaller than in Fig. 6 to catch a smaller size fitting (Fig. 7), the resultingly greater thickness of the ring will make it necessary to notch the internal periphery at 28 so as not to reduce the desired flexibility.

The operation is readily understood. In Figure 1 the problem is to catch the box B of the lost sucker rod S. It is to be understood that the form here shown is also adapted to catching pins. The ring 23 is initially in a resting position against the shoulder $7^a$. The internal diameter 26 is less than the external diameter of the box B. When the latter is contacted by the ring 23 upon lowering the tool in the direction of arrow $e$ (Fig. 1), the first act is to push the ring up into the space 20 (Fig. 2). The shoulder 21 stops the ring, but the ring has expanded sufficiently to let the box B on through.

As soon as the box passes the ring, the latter immediately moves downwardly (arrow $f$, Fig. 3) because the pressure of the spring $5^a$ upon it is constant. The flare 19 partially closes the ring. The internal diameter 26 is not yet as small as it was before (Fig. 1) but small enough to catch the box B when the barrel is raised in the direction of arrow g (Fig. 4).

As soon as the lower end of the box contacts the ring 23, the latter is forced to its original position at the bottom of the flare 19 (Fig. 4). The split 25 is closed as before, and the ring provides an adequate support for the box so that the box must go with the tool.

I claim:

1. A fishing tool comprising a barrel having an annular recess bounded at the top and bottom by inwardly directed shoulders, the recess being of largest diameter adjacent to the top shoulder and merging into an upward flare beginning at the bottom shoulder, a plain split ring situated in the recess and being limited by either shoulder when moved, a sleeve loose in the barrel and resting on the ring, and a spring imposing pressure on the sleeve.

2. A fishing tool comprising a barrel having an annular recess normally of less height than diameter, bounded at the top and bottom by inwardly directed shoulders, the recess being of largest diameter adjacent to the top shoulder and merging into an upward flare beginning at the bottom shoulder, a plain split ring situated in the recess, being of less height than the recess and limited by either shoulder when moved, a sleeve loose in the barrel and resting on the ring, and a spring imposing pressure on the sleeve.

3. A fishing tool comprising a barrel having an annular internal recess near one end of the barrel, varying in diameter from end to end and defining confronting stop shoulders, a plain split ring situated in the recess and limited by either shoulder when moved, and means tending to keep the ring in engagement with one shoulder.

ALBERT H. NEILSON.